United States Patent
Bongwald

(10) Patent No.: US 10,315,573 B2
(45) Date of Patent: *Jun. 11, 2019

(54) METHOD FOR DISPLAYING INFORMATION TO VEHICLE DRIVER

(71) Applicant: MAGNA ELECTRONICS INC., Auburn Hills, MI (US)

(72) Inventor: Olaf Bongwald, Aschaffenburg (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/029,753

(22) Filed: Jul. 9, 2018

(65) Prior Publication Data

US 2018/0312111 A1 Nov. 1, 2018

Related U.S. Application Data

(63) Continuation of application No. 14/623,690, filed on Feb. 17, 2015, now Pat. No. 10,017,114.
(Continued)

(51) Int. Cl.
*B60R 1/00* (2006.01)
*G02B 27/00* (2006.01)
*G02B 27/01* (2006.01)

(52) U.S. Cl.
CPC ............ *B60R 1/00* (2013.01); *G02B 27/0093* (2013.01); *G02B 27/0101* (2013.01);
(Continued)

(58) Field of Classification Search
CPC combination set(s) only.
See application file for complete search history.

(56) References Cited

U.S. PATENT DOCUMENTS 5,550,677 A 8/1996 Schofield et al.
5,670,935 A 9/1997 Schofield et al.
(Continued)

FOREIGN PATENT DOCUMENTS

DE 102012203491 A1 9/2013
DE 102013206614 A1 10/2014
(Continued)

OTHER PUBLICATIONS

EyeTracking Company Website Screenshot: http://www.eyetracking.com/About-Us/Our-Company.
(Continued)

*Primary Examiner* — Janese Duley
(74) *Attorney, Agent, or Firm* — Honigman LLP

(57) ABSTRACT

A method for displaying information to a driver of a vehicle includes disposing a camera at a vehicle and disposing a bimodal display at a display region at a windshield of the vehicle. Responsive at least in part to determination that gaze of the driver is not at the display area or gaze of the driver is at the display region and the driver is not focusing at the display region for the threshold period of time, the bimodal display operates in a first mode, where the bimodal display is transmissive of visible light therethrough. Responsive at least in part to determination that gaze of the driver is at the display region and the driver is focusing at the display region for the threshold period of time, the bimodal display operates in the second mode, where images derived from captured image data are displayed at the display region.

20 Claims, 10 Drawing Sheets

Related U.S. Application Data

(60) Provisional application No. 62/035,615, filed on Aug. 11, 2014, provisional application No. 61/991,810, filed on May 12, 2014, provisional application No. 61/941,568, filed on Feb. 19, 2014.

(52) U.S. Cl.
CPC ... *B60R 2300/205* (2013.01); *B60R 2300/404* (2013.01); *B60R 2300/607* (2013.01); *B60R 2300/802* (2013.01); *B60R 2300/806* (2013.01); *B60R 2300/8046* (2013.01); *B60R 2300/8066* (2013.01); *B60R 2300/8086* (2013.01); *B60R 2300/8093* (2013.01); *G02B 2027/014* (2013.01); *G02B 2027/0138* (2013.01); *G02B 2027/0141* (2013.01)

(56) References Cited

U.S. PATENT DOCUMENTS

| | | |
|---|---|---|
| 5,949,331 A | 9/1999 | Schofield et al. |
| 7,043,056 B2 | 5/2006 | Edwards et al. |
| 7,331,671 B2 | 2/2008 | Hammoud |
| 7,460,693 B2 | 12/2008 | Loy et al. |
| 7,572,008 B2 | 8/2009 | Elvesjo et al. |
| 7,653,213 B2 | 1/2010 | Longhurst et al. |
| 7,914,187 B2 | 3/2011 | Higgins-Luthman et al. |
| 8,066,375 B2 | 11/2011 | Skogo et al. |
| 8,120,577 B2 | 2/2012 | Bouvin et al. |
| 8,165,347 B2 | 4/2012 | Heinzmann et al. |
| 8,185,845 B2 | 5/2012 | Bjorklund et al. |
| 8,220,926 B2 | 7/2012 | Blixt et al. |
| 8,314,707 B2 | 11/2012 | Kobetski et al. |
| 8,339,446 B2 | 12/2012 | Blixt et al. |
| 8,342,687 B2 | 1/2013 | Blixt et al. |
| 8,562,136 B2 | 10/2013 | Blixt et al. |
| 8,610,768 B2 | 12/2013 | Holmberg et al. |
| 10,017,114 B2 | 7/2018 | Bongwald |
| 2003/0169907 A1 | 9/2003 | Edwards et al. |
| 2004/0193371 A1 | 9/2004 | Koshiji et al. |
| 2006/0274973 A1 | 12/2006 | Mohamed et al. |
| 2007/0014916 A1 | 1/2007 | Daniels |
| 2007/0297692 A1 | 12/2007 | Hamatani et al. |
| 2008/0077882 A1 | 3/2008 | Kramer et al. |
| 2009/0304232 A1 | 12/2009 | Tsukizawa |
| 2010/0097580 A1 | 4/2010 | Yamamoto et al. |
| 2012/0093358 A1 | 4/2012 | Tschirhart |
| 2012/0154591 A1 | 6/2012 | Baur et al. |
| 2013/0050258 A1 | 2/2013 | Liu et al. |
| 2013/0229523 A1 | 9/2013 | Higgins-Luthman et al. |
| 2014/0062946 A1 | 3/2014 | Graumann et al. |
| 2014/0063359 A1 | 3/2014 | Chen |
| 2014/0072230 A1 | 3/2014 | Ruan et al. |
| 2014/0139655 A1 | 5/2014 | Mimar |
| 2014/0218529 A1 | 8/2014 | Mahmoud et al. |
| 2014/0247352 A1 | 9/2014 | Rathi et al. |
| 2014/0300739 A1 | 10/2014 | Mimar |
| 2014/0300830 A1 | 10/2014 | Wang |
| 2014/0336876 A1 | 11/2014 | Gieseke et al. |
| 2015/0009010 A1 | 1/2015 | Biemer |
| 2015/0022664 A1 | 1/2015 | Pflug et al. |
| 2015/0092042 A1 | 4/2015 | Fursich |
| 2015/0145995 A1 | 5/2015 | Shahraray et al. |
| 2015/0156383 A1 | 6/2015 | Biemer et al. |
| 2015/0185834 A1 | 7/2015 | Wingrove et al. |
| 2015/0232030 A1 | 8/2015 | Bongwald |
| 2015/0294148 A1 | 10/2015 | Mohanakrishnan et al. |
| 2015/0294169 A1 | 10/2015 | Zhou et al. |
| 2015/0296135 A1 | 10/2015 | Wacquant et al. |
| 2016/0137126 A1 | 5/2016 | Fursich et al. |
| 2016/0209647 A1 | 7/2016 | Fursich |

FOREIGN PATENT DOCUMENTS

| | | |
|---|---|---|
| WO | WO-2015/117904 A1 | 8/2015 |
| WO | WO-2015/117905 A1 | 8/2015 |
| WO | WO-2015/117906 A1 | 8/2015 |
| WO | WO-2015/117907 A2 | 8/2015 |

OTHER PUBLICATIONS

Kircher et al., "Vehicle Control and Drowsiness", VTI meddelande 922A, Swedish National Road and Transport Research Institute, 2012.

Klefenz, "Real-Time Calibration-Free Autonomous Eye Tracker," Fraunhofer Institute for Digital Media Technology IDMT, Ilmenau University of Technology, Dept. Biosignal Processing, Germany, IEEE, 2010.

Kong et al., "Accurate Iris Segmentation Based on Novel Reflection and Eyelash Detection Model," Biometrics Technology Centre, Proceedings of 2001 International Symposium on Intelligent Multimedia, Video and Speech Processing, May 2-4, 2001, Hong Kong.

Tobii Technology the World Leader in Eye Tracking and Gaze Interaction Company Article, Feb. 14, 2012.

Wildes et al., "A System for Automated Iris Recognition," David Sarnoff Research Center, Inc., Princeton, NJ 08543, IEEE, 1994.

Yarrow, "Eye-tracking technology—how your car will watch your every move for you", MSN Cars, Feb. 18, 2014.

METHOD FOR DISPLAYING INFORMATION TO VEHICLE DRIVER

CROSS REFERENCE TO RELATED APPLICATIONS

The present application is a continuation of U.S. patent application Ser. No. 14/623,690, filed Feb. 17, 2015, now U.S. Pat. No. 10,017,114, which claims the filing benefits of U.S. provisional applications, Ser. No. 62/035,615, filed Aug. 11, 2014, Ser. No. 61/991,810, filed May 12, 2014, and Ser. No. 61/941,568, filed Feb. 19, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a display at the interior of the vehicle for viewing by the driver of the vehicle when the driver is normally operating the vehicle. The display system is operable in conjunction with a driver monitor or eye gaze detection system or the like, whereby the display is activated or energized or switched or changed to a display state when the system determines that the driver is looking at the display area (such as when the system determines that the driver's gaze is at the display area for at least a threshold period of time). The display unit may comprise an invisible or transparent or light transmissive display unit, such that the display unit is substantially non-discernible when in its transparent state or deactivated.

These and other objects, advantages, purposes and features of the present invention will become apparent upon review of the following specification in conjunction with the drawings.

DESCRIPTION OF THE PREFERRED EMBODIMENTS

A vehicle vision system and/or display system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction or to display other traffic participants rearwardly and sidewardly of the vehicle, such as to assist a driver of the vehicle when the driver is driving the vehicle forwardly during a lane change by displaying the scene or highlighting or warning when other traffic participants are in the blind spot region at or near the vehicle. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
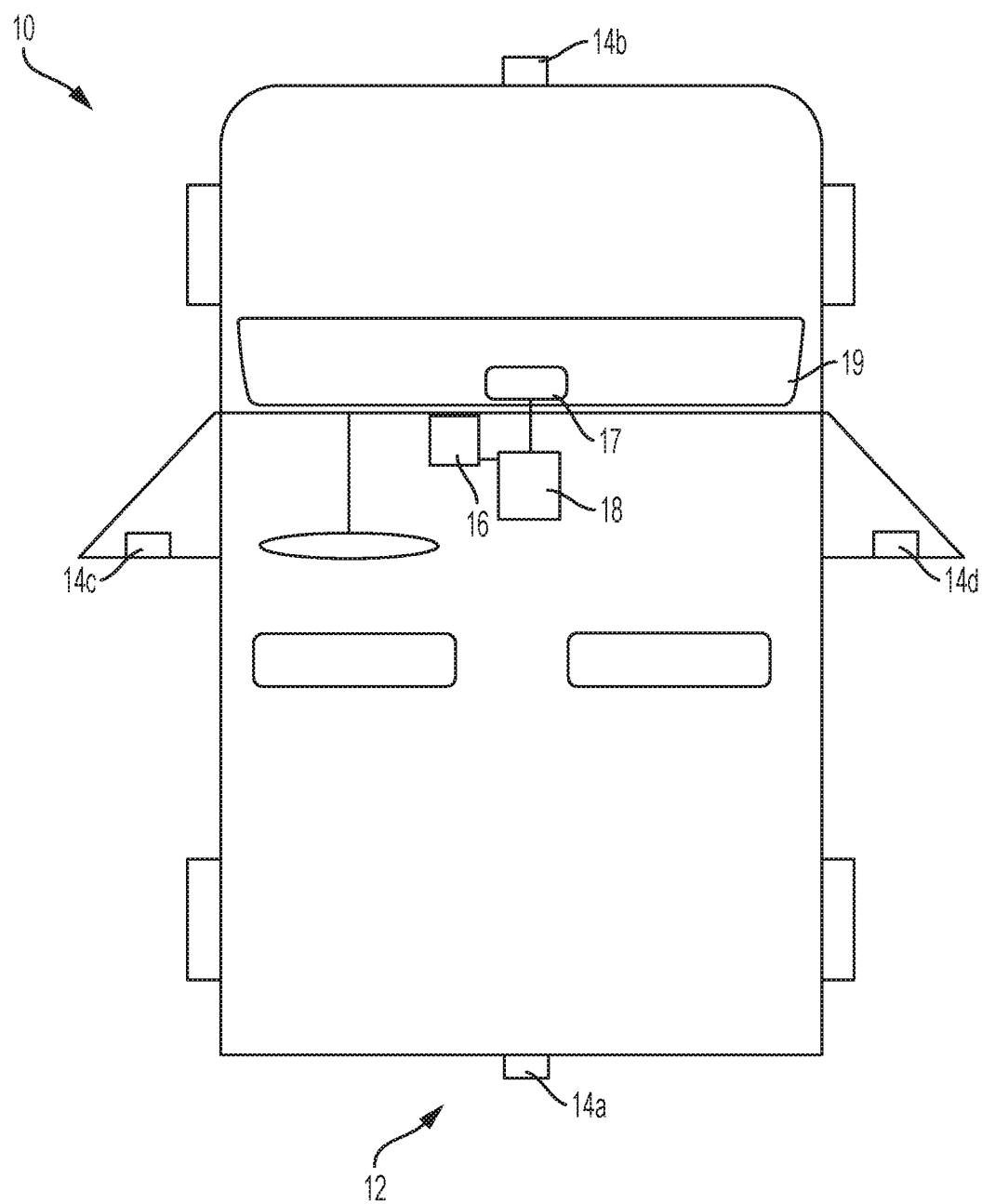
FIG. 1 is a plan view of a vehicle with a vision system that incorporates cameras and a display system in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device or unit 17 for viewing by the driver of the vehicle (although shown in FIG. 1 as being at a windshield 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The display system may be responsive to or may include a driver gaze detection system or driver monitoring system 16, which is operable to determine the driver's gaze direction to determine when the driver is looking at the display area.

In a typical vehicle, there is a rear view mirror mounted in the upper center region of the windshield that allows the driver of the vehicle to view the traffic behind the vehicle through the vehicle's rear window. The mirror itself is hiding a part of the outside scene in front of the vehicle. For example, in vehicles with the steering wheel on the left side, the mirror hides or obscures a part of the top right view from the viewpoint of the driver. This is irrelevant most of the time when driving, but sometimes the mirror hides essential parts of the scene, such as traffic lights or road signs or the like.

Figure 8:
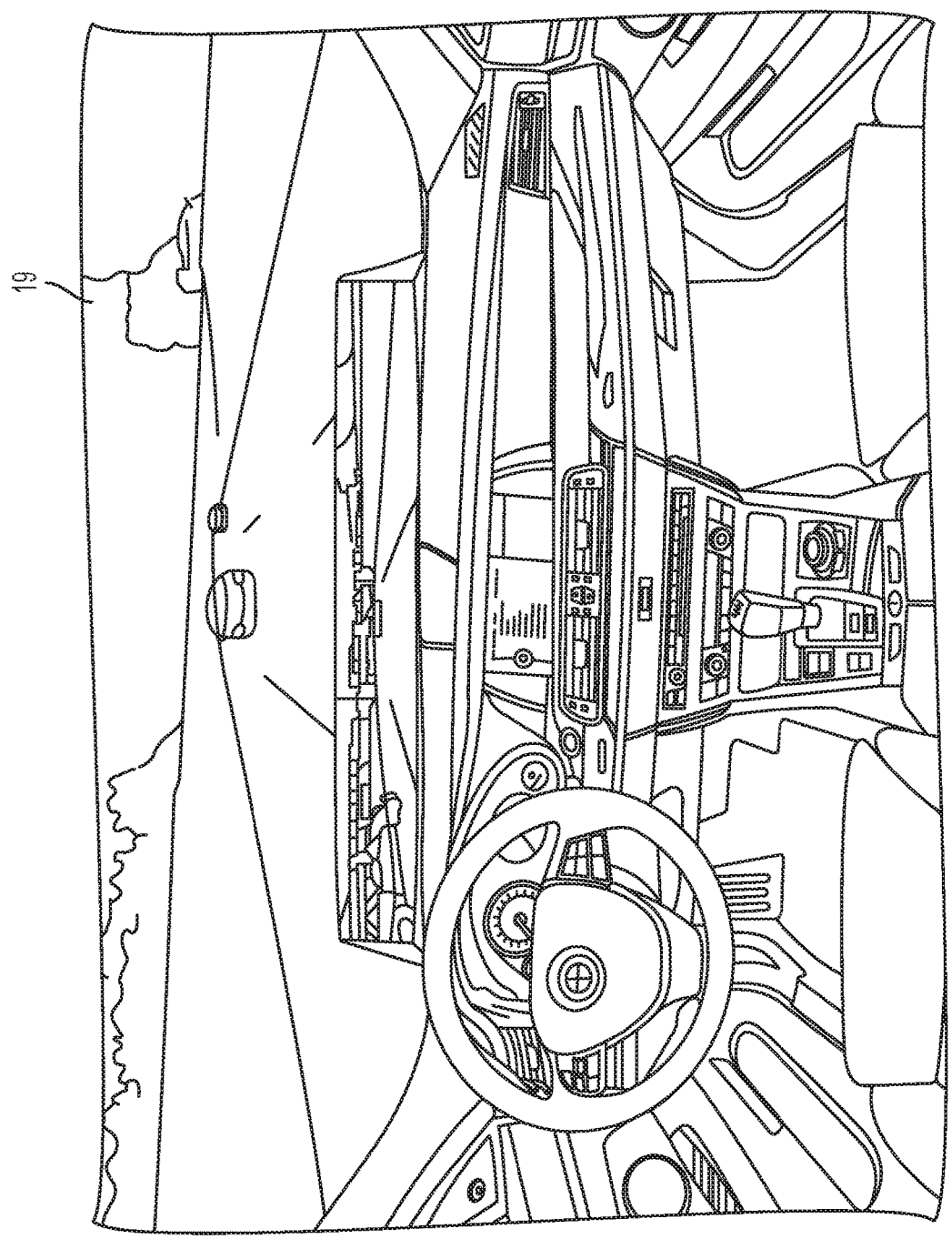
FIG. 8 is a view of a vehicle interior, with a heads up display of the present invention projected at a lower region of the vehicle windshield.
Figure 9:
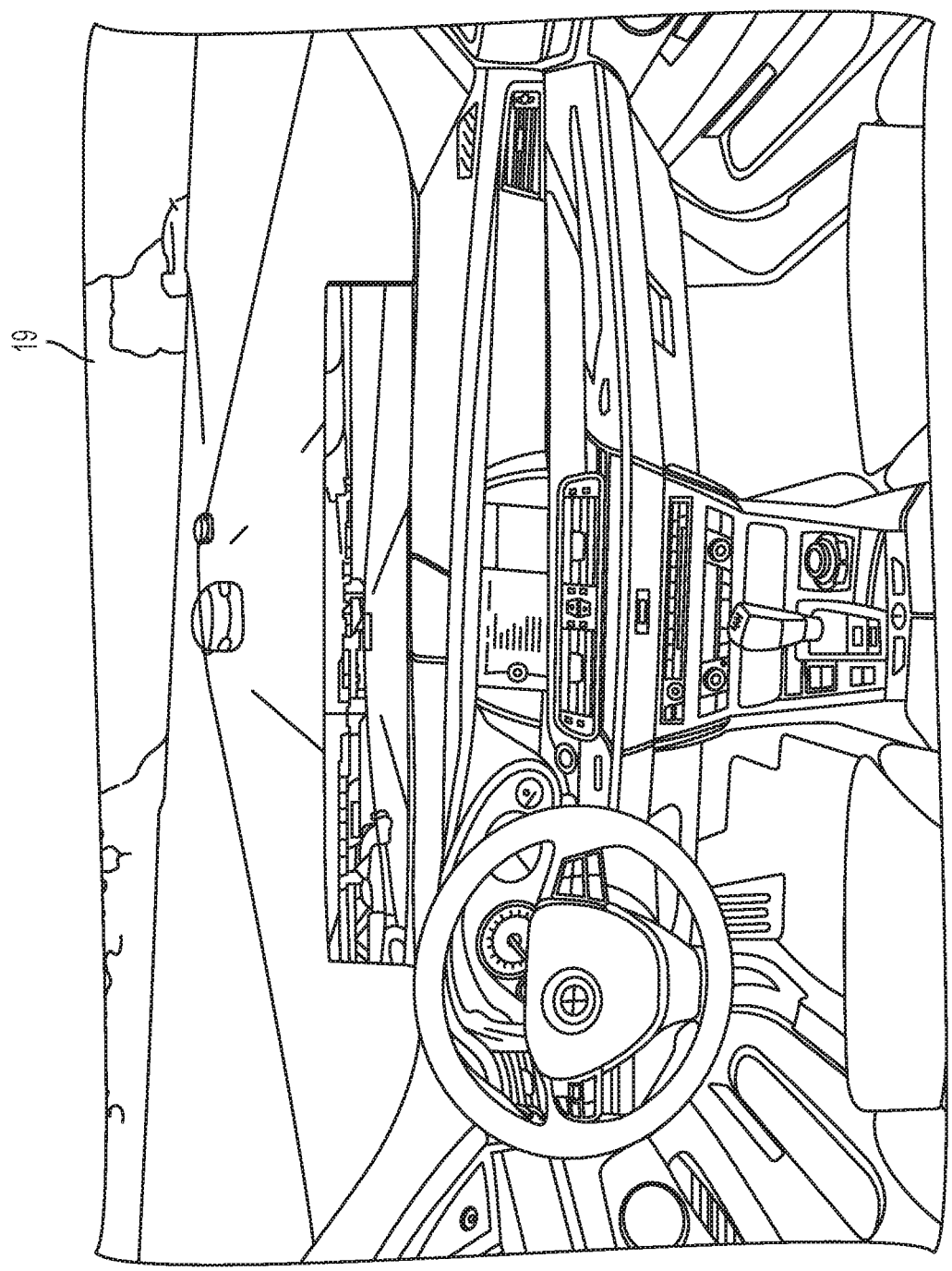
FIG. 9 is a view of a vehicle interior, with a selectively transparent or hidden display of the present invention located at and viewable (when activated) at a lower region of the vehicle windshield.

The present invention provides a display system that avoids the scene blocking of a known mirror assembly. The system of the present invention uses a driver eye gaze system and a transparent display instead of a rearview mirror, with the display being mountable at the same area and/or angle relative to the driver's view, such as where a conventional (central) rearview mirror may be mounted. The display may show the scene of the traffic or objects or the like behind the vehicle. The displayed images may be derived from image data captured by a rear camera and/or image data or images stitched with two or more cameras' captured image data or images such as a rear camera and/or side mounted cameras (such as by utilizing aspects of the systems described in U.S. Publication Nos. US-2012/0154591; US-2013-0229523 and/or US-2014-0247352, and/or International Publication Nos. WO 2013/109869 and/or WO 2014/204794, which are hereby incorporated herein by reference in their entireties), such as shown FIGS. 8, 9 and 10. For example, and such as shown in FIG. 8, a heads up display of the present invention is shown at the lower region of the windshield. Also, for example, and such as shown in FIG. 9, a switchable OLED display of the present invention may be selectively displayed at the lower region of the windshield. Optionally the display may be a full windshield display.

Figure 10:
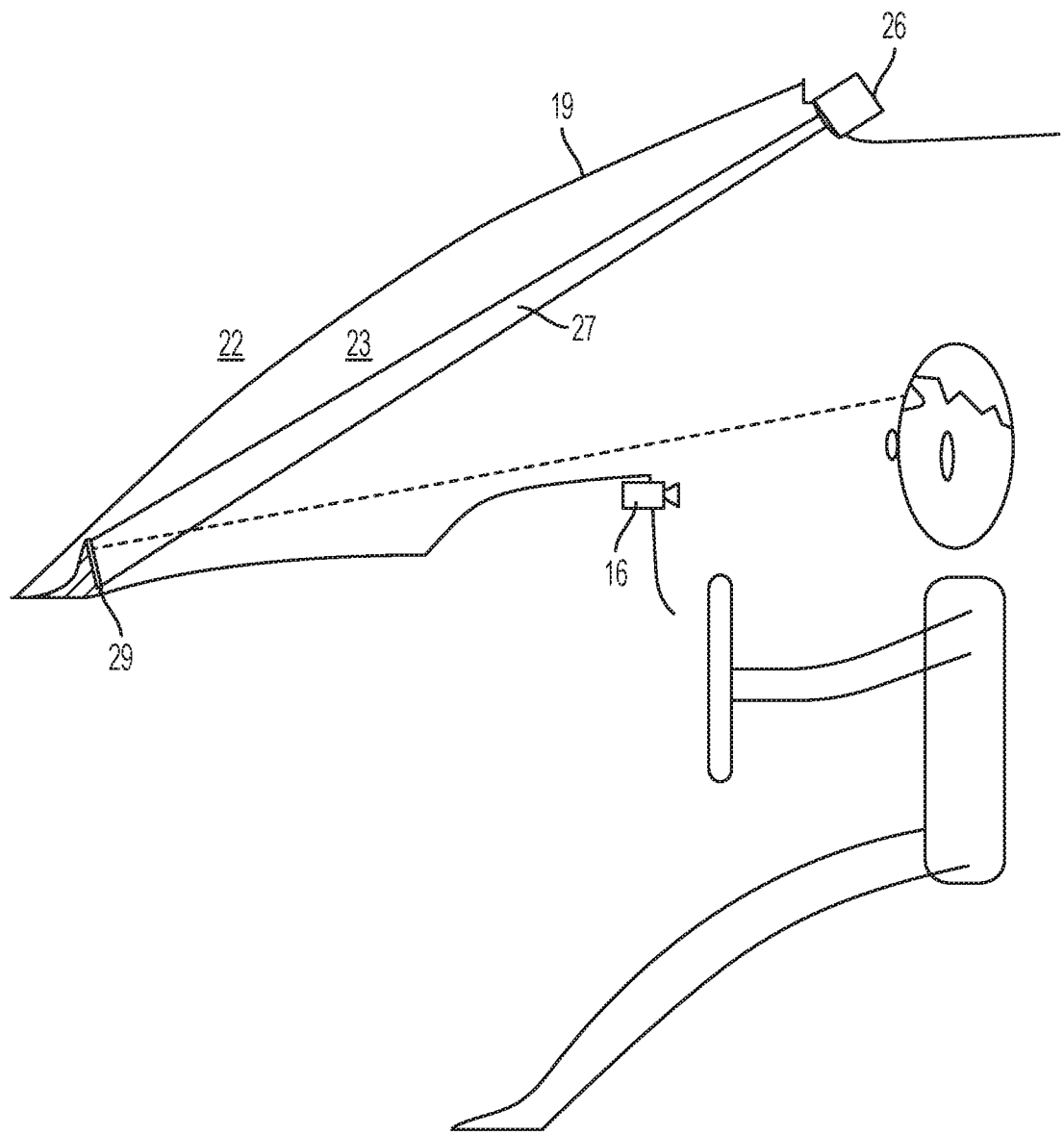
FIG. 10 shows a projector mounted at the interior roof area that projects a beam to a combiner mounted in the region of the lower end of the windshield 19, with a gaze detection system installed at the dashboard for detecting the driver's gaze in accordance with the present invention.

Also, for example, and such as shown in FIG. 10, a projector 26 may project light 27 for a display to a projector combiner 29, which may be mounted in the region of the lower end of the windshield 19. The display may be viewable (when activated) by a person viewing the windshield from inside 23 the vehicle, and may or may not (depending on optional coatings or layers at the windshield or display) be viewable to a person viewing the windshield from outside 22 of the vehicle.

Figure 2:
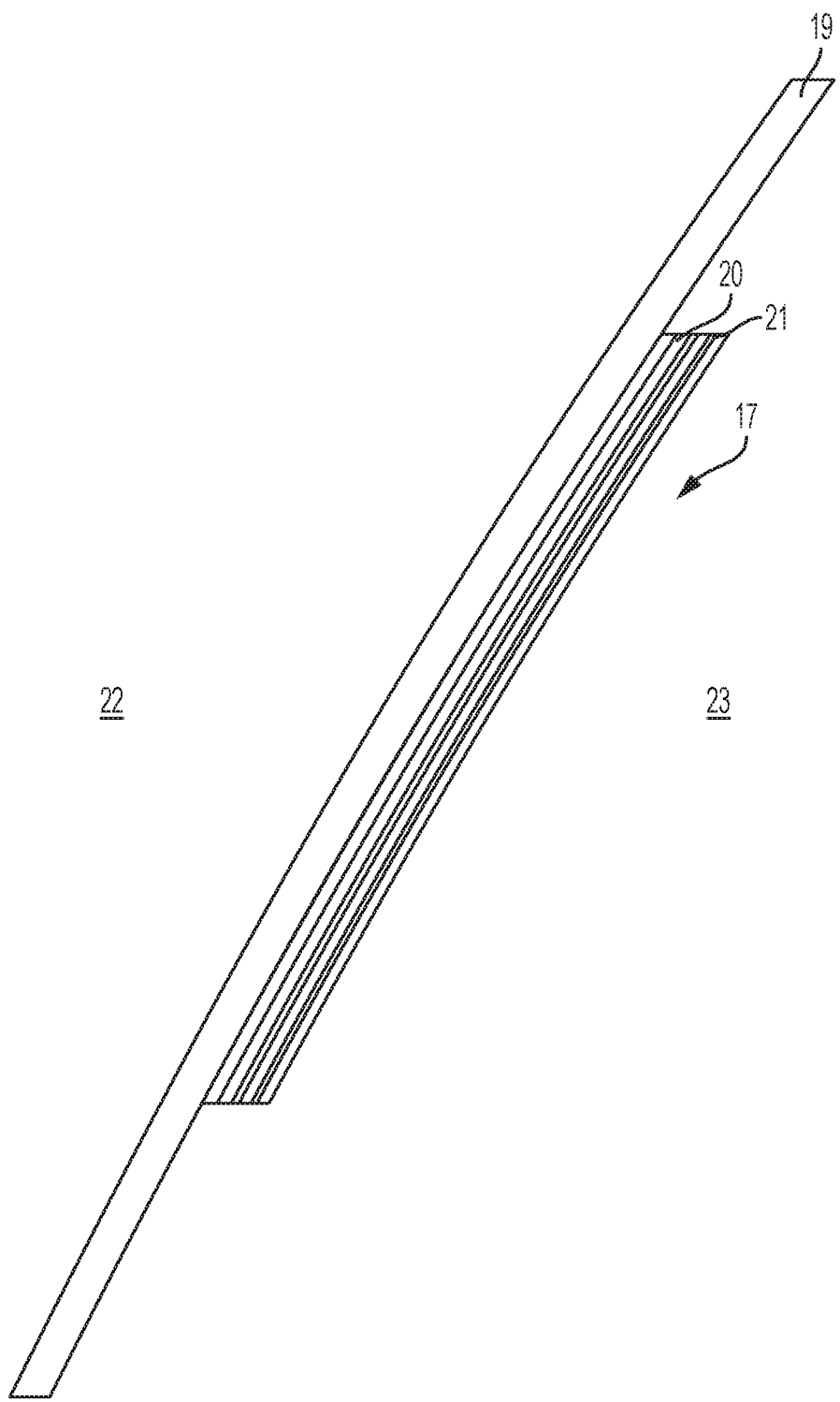
FIG. 2 is a cross section of a windshield having a display unit, such as an OLED based display unit, in accordance with the present invention.

Optionally, and such as shown in FIG. 2, a display unit 17 is disposed inside 23 the vehicle at an interior surface of a windshield 19 of a vehicle. The display unit 17 comprises an OLED-display foil 21, which is attached to a LC blackening or darkening foil 20. The display may be viewable (when activated) by a person viewing the windshield from inside 23 the vehicle, and may or may not (depending on optional coatings or layers at the windshield or display) be viewable to a person viewing the windshield from outside 22 of the vehicle. The LC blackening or darkening foil and OLED foil in combination comprise the display unit 17, and wiring (not shown in FIG. 2) may electrically connect the display unit to vehicle wiring, such as at the interior rearview mirror assembly or windshield electronics module or headliner of the vehicle.

Optionally, the display system of the present invention may utilize a retinal display (or projector). The display may be mounted in the roof unit or column and may have a direct view to the driver's eyes, or may be at or near the place or incorporated to the camera or one of the cameras or illumination source of a driver gaze detection system. The system may provide a retinal display for viewing by the driver of the vehicle, such as by utilizing aspects of the systems described in U.S. patent application Ser. No. 14/489,659, filed Sep. 18, 2014 and published Apr. 2, 2015 as U.S. Publication No. US-2015-0092042, which is hereby incorporated herein by reference in its entirety.

U.S. patent publication No. US-2015-0009010, which is hereby incorporated herein by reference in its entirety, describes systems that switch and/or control vehicle inherent devices or functions by determination of the driver's eye gaze. The system of the present invention may provide a rearview display that may stay inactive and substantially or fully (or best as technically possible) transparent at times (such as at least about 25 percent transmissive of light therethrough, preferably at least about 50 percent transmissive and more preferably at least about 75 percent transmissive) when the driver's eyes are resting or focusing on the outside scene (such as when the driver is looking forwardly during normal driving situations). The display may engage or activate (or change from its transmissive state to its display state) when the system determines that the driver directs his or her view toward the display (such as to view the display to see the scene rearward of the vehicle), whereby the activated display may show the vehicle's rear view (comparable to a typical view through a conventional rear view mirror) or may show a wide range rear view (which may be about a 180 degree view which may cover several lanes), a panorama view which may be up to about 290 degrees horizontally (to the rear and side scene around the vehicle) or a virtual view (which may be a view such as from looking from an elevated view point, such as, for example, the roof top of the vehicle, to the rear or such as from the vehicle's center with the vehicle's rear partially or fully transparent or just missing) and optionally overlays or the like, for assisting the driver in viewing rearward.

Optionally, there may be a dot or small target for the driver to fixate at or focus on at the windshield or close to the windshield or screen. Optionally, the function may not engage or activate rapidly when the driver just hovers or glances over at the display's position. For example, the system may include a fixed or (manually, automatically or system learnable) delay time for the delay in activation, whereby the display may activate only when the driver's gaze is determined to be looking at the display for at least about 0.5 seconds or at least about 1 second or the like. Optionally, there may be a hysteresis in time for activating and inactivating the mirror display. When the mirror display is on, it may not switch off when the driver's gaze temporarily leaves the mirror's display area, such as within, for example, about 0.5 seconds after the driver's gaze temporarily leaves the mirror's display area. Optionally, the gaze area for keeping the mirror activated may be extended when the mirror is turned on. There may be a time wise and a (gaze-) space wise hysteresis in combination.

Figure 3:
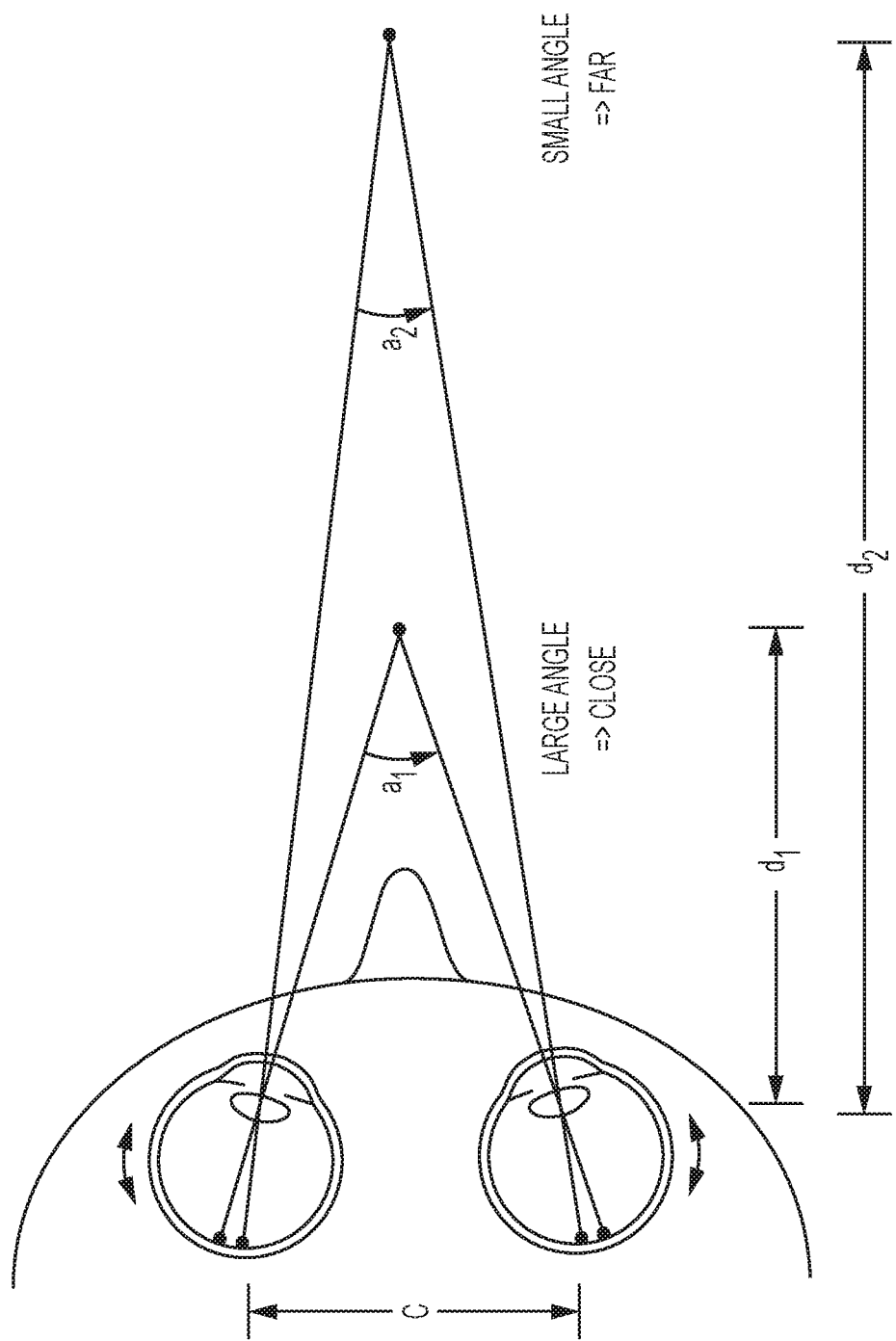
FIG. 3 is an exemplary schematic showing the difference of a large eye angle a1 when the focal distance to an object in front of a viewer is short d1 and small eye angle a2 when the focal distance to an object in front of a viewer is far d2.

Optionally, the eye gaze system may include the ability to determine whether the driver's eyes are focused at a near distance (such as the distance to the windshield) or a far distance (such as to nearly infinite such as when looking at the scene outside the vehicle). The system may engage or activate the display responsive to the focal range and to the eye gaze, and may engage or be activated when the system determines that the driver is focusing his or her gaze at the windshield plane into the area he or she expects the rear view image to appear. Typically, eye gaze systems determine the general viewing direction. To determine the focal depths of a viewer's (driver's) eye pair there are two methods, which may come into use independently or in combination. One is to determine the difference of the eyes' general viewing angle or angles to a common center. The closer the viewing point is to the driver, the higher the difference or angle is of the eyes (FIG. 3).

Another method is to project an (use-) image (which may be visible) or a test pattern (which may be in an invisible wave length) via a retinal display or a similar projection unit to the eye ball's back plane (the retina). Due to the light refraction being different when the human eye's flexible lens is relaxed to when the lens (its muscles) are strained, the image or test pattern on the retina may appear larger or smaller or sharper or less sharp to a camera looking into the eye. The camera may be similar or identical to the eye gaze camera. In practice, the test pattern may be reduced to just two infrared (IR) light rays, projecting two test points which distance may be detectable. The focus detection system may be incorporated to the above retina projector and may be similar to or the same as the sharpness (focus) control.

Figure 4:
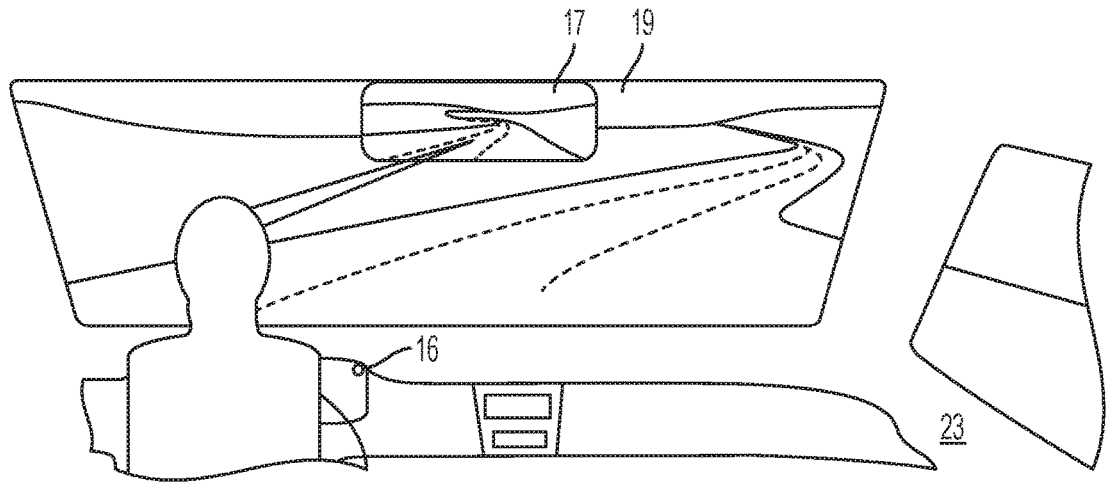
FIG. 4 shows an in cabin scene as the driver is following a road (to be seen in front) and shows the display at the windshield, and activated when the driver's gaze is detected by the eye tracking system to be viewing the display area at the windshield.
Figure 5:
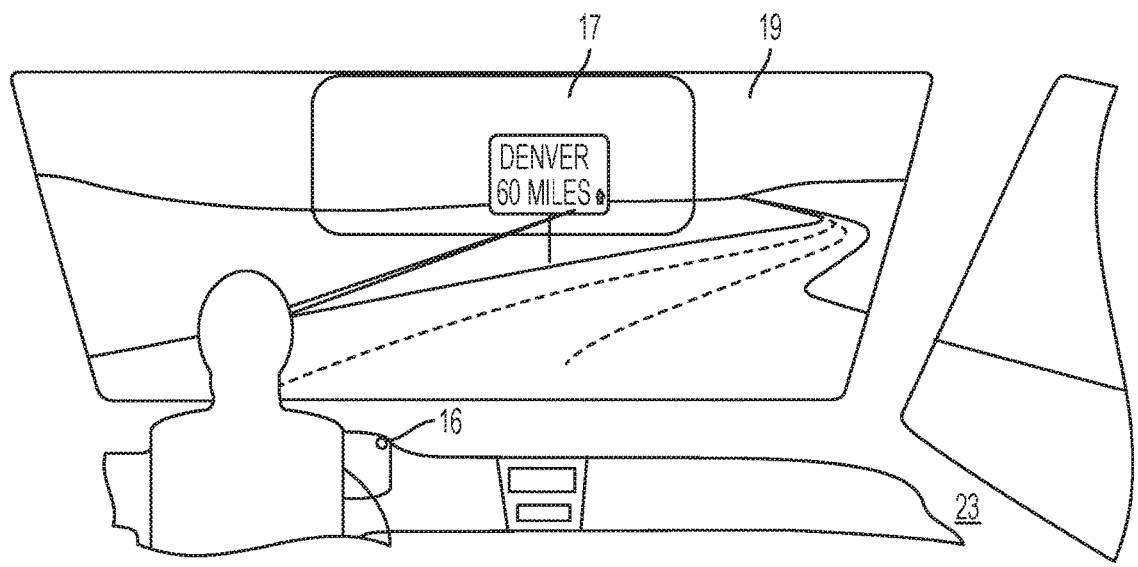
FIG. 5 shows a similar in cabin scene as FIG. 4, with the display at the windshield being deactivated such as when the driver's gaze is detected by the eye tracking system to be viewing the road or road sign ahead of the vehicle.

Thus, the system may be able to determine not only the direction of the driver's gaze, but the focal distance, in order to determine when the driver is actually focusing on the display area at the window (so as to want to view the displayed information) or on or near a point outside of the vehicle that happens to have a line of sight from the driver through the display area of the window. When the driver is viewing through the windshield to a point (such as scenery or a street sign or traffic light or the like) outside of the vehicle, it would be undesirable to have the display system activate the display, since the display would then block the driver's view. FIG. 4 shows an in-cabin scene as the driver (inside 23 the vehicle) is driving the vehicle along a road (to be seen in front of the vehicle). When the driver looks and focuses at the display area at the windshield 19, the system (such as via the eye tracking system 16) determines that the driver is focusing at the display area and activates the OLED display 17 at the windshield, whereby the rearview image is displayed and the back light blocking blackening or darkening LC is turned on. FIG. 5 shows a similar in-cabin scene as FIG. 4, but FIG. 5 shows when the eye tracking system 16 determines that the driver (inside 23 the vehicle) is focusing at a point outside of the vehicle (such as at a street sign or the like), whereby the system does not activate the rearview image display and the OLED display and the rear blackening or darkening LC are deactivated or not activated (so as to be substantially transparent and not viewable by the driver of the vehicle). The eye tracking system may determine the focal distance of the driver's eyes to determine when the driver is viewing a distant point or object outside of the vehicle, even though the driver's gaze direction may be directed generally towards the display area at the windshield of the vehicle.

Optionally, the transparent display may have a (fully or partial) rear blackening or darkening functionality for better conception of the rear scene when there is strong light or structure in front of the transparent mirror (such as may occur during higher ambient lighting conditions, such as a sunny day or the like). The rear blackening or darkening may be done by the use of known art (such as from TV or projector shutters) liquid crystal (LC), such as LC polymers or elastomers, preferably by an LC on a durable, flexible transparent substrate (or foil).

Optionally, the transparent display unit itself may utilize organic light emitting diodes (OLEDs), which may be applied on a flexible transparent substrate or foil. Preferably, the OLED may be fixed directly at or may be incorporated to the windshield together with the blackening or darkening LC behind. The OLED pixels display the rearview image, and are operable to illuminate the display when electrical power is supplied. The power and data lines may be supplied by or communicated via very thin wires, which may be substantially unnoticeable or undiscernible to a person viewing the display area at the windshield of the vehicle. Optionally, the power or data lines may comprise a translucent, conductive material, such as a transparent or semi-transparent conductive trace comprising, for example, Graphene or the like (and such as described in U.S. provisional application Ser. No. 61/991,809, filed May 12, 2014, which is hereby incorporated herein by reference in its entirety). The transparent display unit may utilize aspects of the display units available from NeoView KOLON of Korea.

Figure 6:
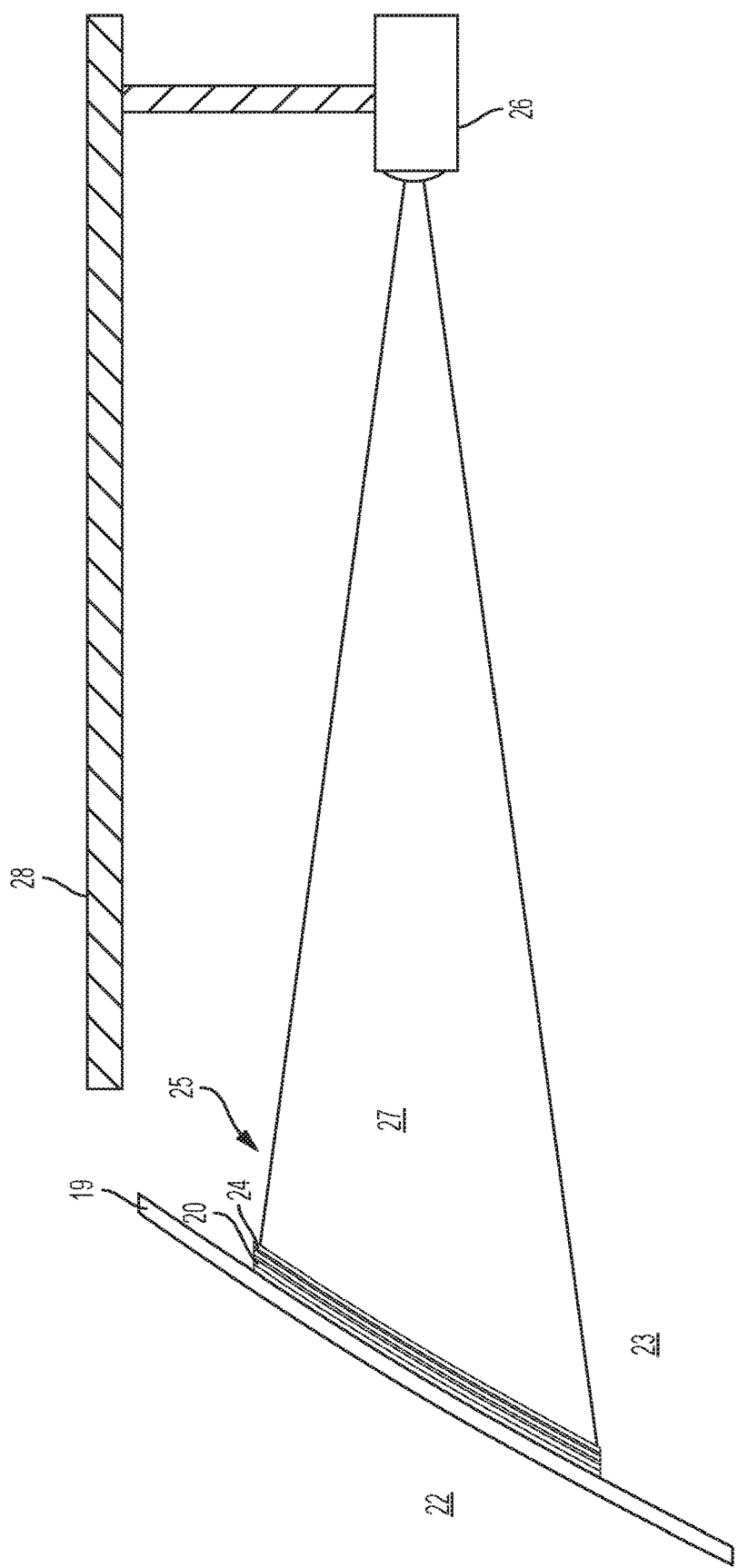
FIG. 6 is a cross section of a windshield and an in cabin area having a projector based display unit and a windshield display screen in accordance with the present invention.

Optionally, a heads up display (HUD) may be used. Optionally, HUDs with 3D capability may be used, such as light field HUDs or the like, such as described in U.S. provisional applications, Ser. No. 62/113,556, filed Feb. 9, 2015, and Ser. No. 62/104,944, filed Jan. 19, 2015, which are hereby incorporated herein by reference in their entireties. In such an application, the illumination may come from a second (remote) source, such as a light bulb (with DLP), LED (with DLP) or Laser projector or the like. The display may comprise a substantially transparent, passively reflecting surface such as the vehicle's front window or windshield 19 (such as shown in FIGS. 8 and 10 at the lower region of the windshield) or a visor or combiner screen 29 in the line of sight of the driver. The display of the present invention may provide a HUD visor or combiner screen 29 (FIG. 10) mounted at the top center area (or bottom center area such as shown in FIG. 8) of the windshield such as at a comparable location 25 (FIG. 6) such as where a typical center rearview mirror may be disposed. Alternatively, the rear view image may be projected to the front window's surface by a HUD or by a projector 26 mounted at the vehicle cabin's top area 28, such as shown in FIG. 6.

Figure 11:
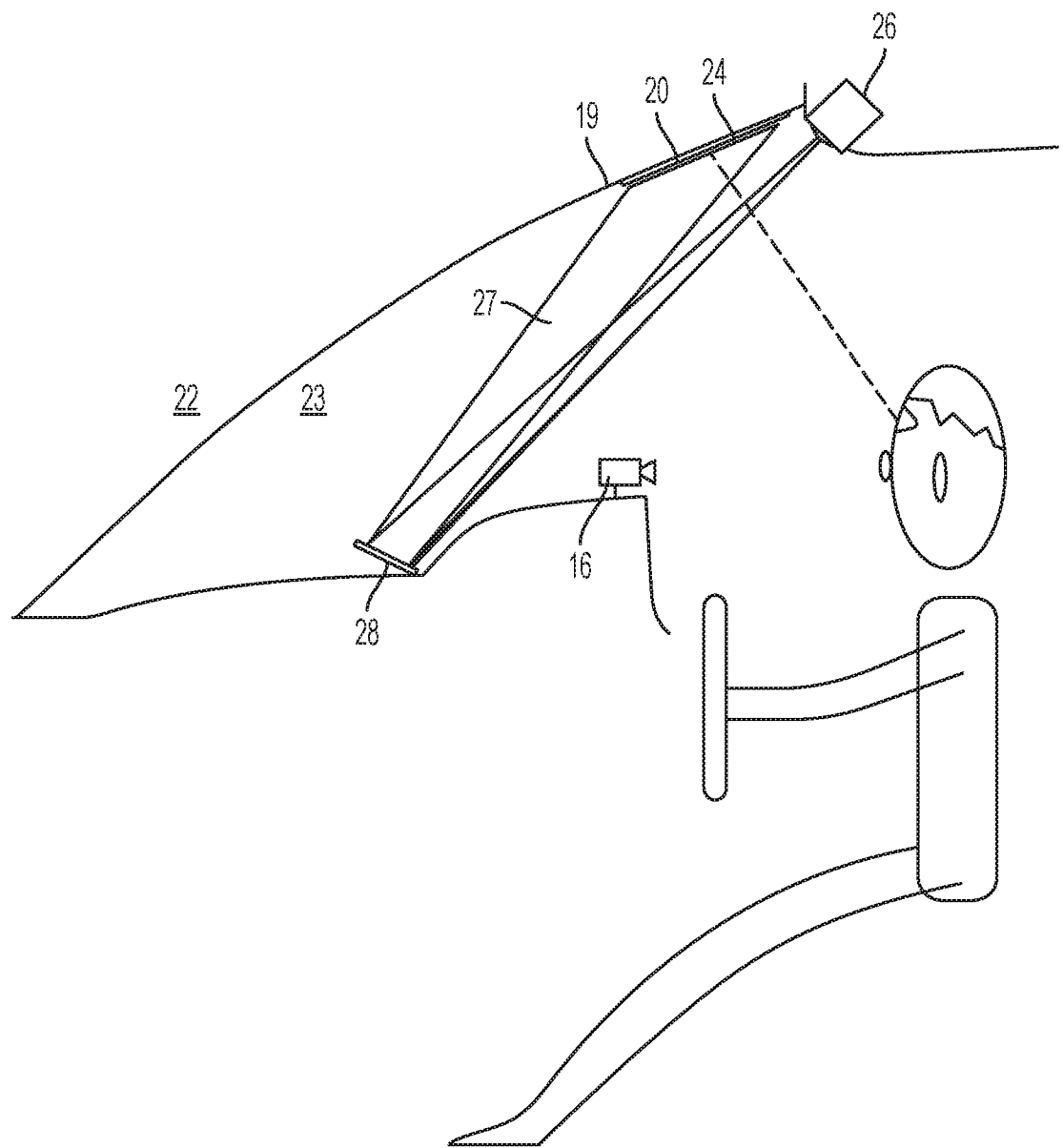
FIG. 11 shows a projector mounted at the interior roof area that projects a beam to a mirror installed at the dashboard area, which reflects the projected beam onto the upper region of the windshield 19, with a gaze detection system installed at the dashboard for detecting the driver's gaze in accordance with the present invention.

Optionally, a HUD projector may be mounted at the top area projecting downwardly. For example, and such as shown in FIG. 11, a mirror 28 may be installed at the dashboard area, preferably off the line of sight of the driver, and may reflect the projected beam 27 (projected by the projector 26) onto the upper region of the windshield 19 (when engaged by the driver's gaze). Alternatively, the image may be projected onto a combiner in the viewable area of the driver in the upper windshield region instead of directly to the windshield. An example in which a top mounted projector is projecting an image to a combiner mounted in the windshield's lower bottom region onto the dashboard is shown in FIG. 11. The solutions of FIGS. 10 and 11 are both preferable since both provide comparable space savings. Optionally, this solution may possess a blackening or darkening foil or LC foil or film or element 20, such as specified above, when mounted at or integrated into the windshield 19.

Optionally, this solution may possess a whitening or opaquening foil or Polymer-Dispersed-Liquid-Crystal (PDLC) foil or film or element 24, which may be applied in front of the darkening foil 20, which is mounted at or integrated into the windshield. This foil may serve as a reflective screen when turned opaque. This works better than blackening LC foil alone. When turned on or energized (such as via a voltage of 24V AC at 50/60 Hz), the PDLC foils turn transparent or substantially transparent, and when the AC power is turned off, the foil turns opaque again. One example of such a foil which may find use in the application of the present invention is Polyvision™ Liquid Crystal (PDLC) Film from Polytronix, Inc. of Richardson, Tex. The foils or films or elements may be laminated similar to conventional windshield lamination processes.

Figure 7:
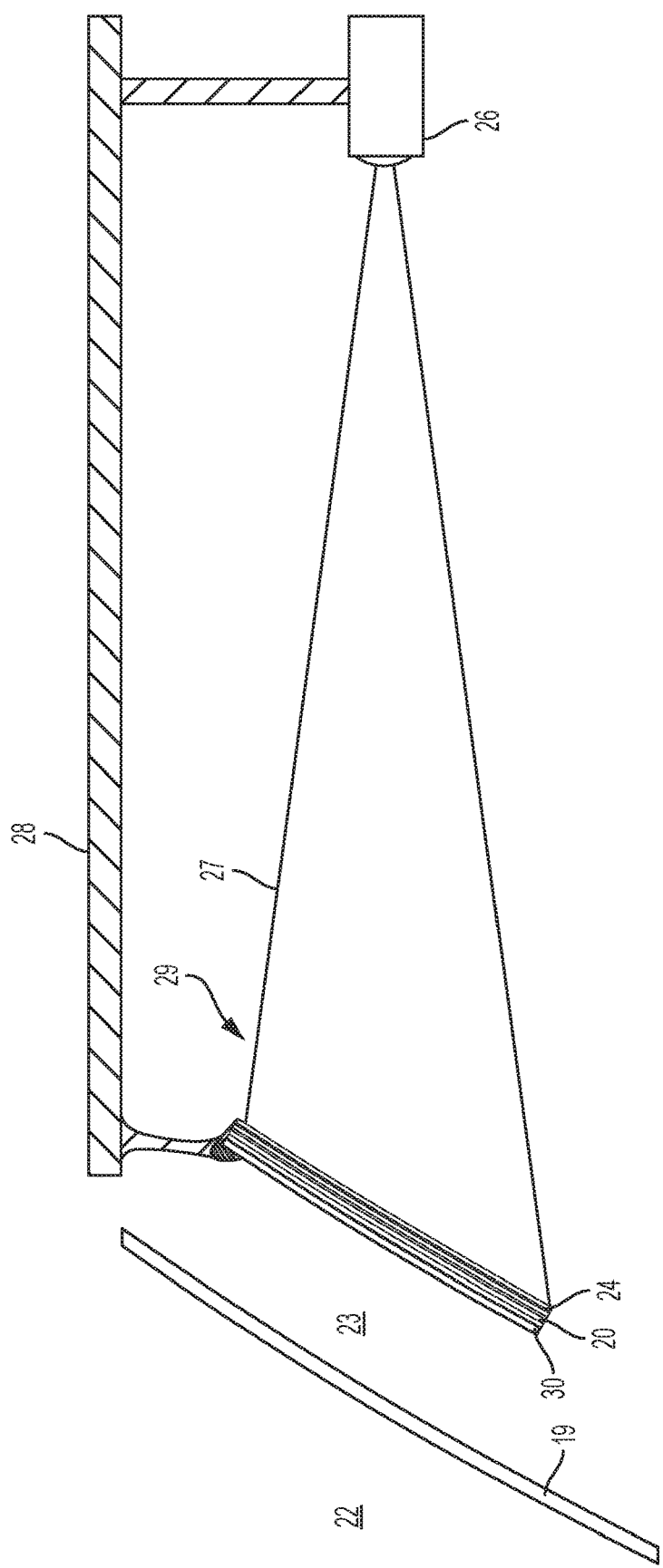
FIG. 7 is a cross section of a windshield and an in cabin area having a projector based display unit and a combiner display screen in accordance with the present invention.

As an alternative option, the stack of darkening or blackening foil/film/layer 20 and opaquening foil/film/layer 24 and its power wiring may be applied to an additional glass substrate 30 comprising a combiner screen 29, which is in the line of sight between the driver and the windshield, preferably near the windshield such as shown in FIG. 7. The present invention thus provides a combiner HUD, which eliminates the light from behind it (the LC foil 20) and which can improve the reflective properties (the opaquening foil 24).

Optionally, the power and/or signal wiring may be made from a substantially transparent material to conduct to or communicate to the active devices such as the display (OLED) 21, the LC blackening or darkening foil 20 and/or the opaquening foil 24. The material may be out of graphene, carbon nano tubes (CNT), silver nano fibers (SNF) indium tin oxide (ITO) or fluorine doped tin oxide (FTO) or a suitable conductive polymer such as poly(3,4-ethylenedioxythiophene) or the like. The conducting material may be applied by sputtering, printing (lithography, deep printing, flat printing, screening), scraping, dip spinning, drawing, wet spraying, powder coating and/or the like. Optionally, such materials may have an additional coating for environmental protection or corrosion prevention.

In both alternative projection display set ups, the LC foil and the PDLC foil may be turned to substantially transparent when the driver focus is onto it or dark and opaque respectively (non-transparent) when the driver focus is to the outside of the vehicle, controlled by the detected eye gaze as described above. The projector may also turn on and off its projection simultaneously.

Optionally, for better visibility in bright light or darkness, the displays may be controlled in a sophisticated tone mapping manner, such as published by APICAL™, Suite 343, 162-168 Regent Street, London W1B 5TD, UK, as 'assertive display' [mode], (see: http://www.apical.co.uk/products/assertive-display/). This tone mapping adapts the display to the environmental light conditions under consideration of the human eye's light conception (which is different in bright light conditions compared to normal illuminated conditions).

In the illustrated embodiment of FIG. 1, the display controller 18 controls the display screen or device 17, which may comprise an OLED display foil with LC blackening or darkening behind the displayed images. The display device or unit 17 is mounted at the vehicle's windshield 19 and is operable to display a demorphed rear view image as captured by or derived from captured image data of the rear camera 14a, which is part of a vision system with its ECU 18 (connected to the display unit 17). The display controller 18 may be responsive to the driver head and eye gaze tracking system 16, which determines the driver's gaze so that the controller 18 can activate the display screen to display images when the controller determines that the driver is looking at the display area (such as for a threshold period of time or the like).

The present invention thus provides a display at a windshield area of the vehicle, with the display being at least partially transparent or non-discernible in its transmissive or transparent state (such as when it is deactivated). When activated (or changed to its display state), the display unit may display images captured by one or more cameras of the vehicle, such as a rearward viewing camera and/or such as multiple cameras of a surround view system of the vehicle. The display unit may be activated in response to a determination that the driver of the vehicle is looking at the display area, so that the displayed images are only displayed when the driver wants to see them. When driving the vehicle forwardly, the driver may only occasionally want to view rearward of the vehicle, so the display unit is deactivated except when a determination is made that the driver is looking at or towards the display area. Optionally, the display may comprise a reflective element that, when in its active or non-transparent state, provides a reflector to allow the driver to view rearwardly via reflection off of the reflector of the display.

Optionally, the transparent display and focal/gaze detection system of the present invention may be used for a navigation screen, whereby the navigation screen may be activated and visible or viewable when the system determines that the driver is looking at the navigation screen display location but otherwise would not be activated and viewable. Optionally, the navigation screen (even when not being viewed and thus not viewable) would automatically activate when the vehicle is approaching a turn or exit or the like on the programmed route. Optionally, the system may include two transparent displays, with a rearview display (functioning like a rearview mirror and operable to display exterior images when viewed by the driver) above a navigation display (functioning as a navigation screen to show a map or driving directions or the like when that area is viewed by the driver), with the system determining which location the driver is looking at and activating the appropriate display according to the determined driver's gaze.

Thus, during normal driving when the driver is viewing ahead of the vehicle while driving the vehicle in a forward direction along a road, neither screen may be activated and the driver can view through the entire windshield. When the driver wants to view rearward (such as during a reversing maneuver or when making a lane change or the like), the driver may gaze at the "rearview mirror" location and the first display may be activated to display the rearward view or the like (optionally, and desirably, the system may automatically change the display to display the rearward view during a reversing maneuver of the vehicle). Also, when the driver wants to view a map or driving instruction or other navigation information, the driver may gaze at a "navigation screen" location (which may be below the mirror location and may be at a lower or bottom region of the windshield), whereby the navigation screen may be activated and viewable to provide the desired information (and/or optionally other vehicle information, such as vehicle status information of vehicle accessories or systems or the like).

Optionally, the display unit may be automatically activated when the vehicle is being driven in reverse. For example, the display unit may be activated responsive to the vehicle being shifted into a reverse gear and may remain activated during the subsequent reversing maneuver. In such a reversing maneuver situation, the display unit may display images derived from the rear viewing camera or from multiple cameras having sidewardly and rearwardly fields of view or from multiple cameras of a surround view system of the vehicle or the like.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

The display unit may comprise a transparent display or retinal display as discussed above, or may comprise other types of displays. For example, the display unit may comprise a heads up display, a visor or combiner display (such as at a visor or combiner of the vehicle or a small combiner display disposed at a dashboard of the vehicle), a retinal eyeglass display, a display showing a wide view to the rear of the vehicle, a head area mounted display, a rear view augmentation (such as a full screen augmentation or an augmentation enabled by a car2car communication system or the like), an OLED on a flexible substrate, a fully transparent (invisible) OLED, a full windscreen augmentation or the like. The display system may be responsive to a driver-head tracking system or eye tracking system or gaze tracking system, and may utilize retina projector glasses (for small distances) or desktop retina projectors medium distances or the like.

Although shown and described as being for an interior display unit that is disposed or viewable generally at an interior mirror location or the like in the vehicle, aspects of the present invention may be applied to a display at an exterior (side-) rearview mirror assembly. For example, a display of an exterior rearview mirror (that may display graphic overlays or alerts or indicia or the like, and that may utilize aspects of the display systems described in U.S. Pat. No. 7,777,611) may be activated when the vision system of the present invention determines that the driver's gaze is directed at or towards the exterior mirror, such as for a threshold period of time. Optionally, such a side mirror may be incorporated to the lower or bottom side corner of the vehicle windshield. Optionally, such a side mirror may be incorporated to the lower or bottom front corner of a side window of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, and/or U.S. publication Nos. US-2015-0009010; US-2014-0139676 and/or US-2013-0278769, and/or U.S. patent application Ser. No. 14/489,659, filed Sep. 18, 2014 and published Apr. 2, 2015 as U.S. Publication No. US-2015-0092042, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Publication Nos. US 2010-0020170 and/or US 2013-0002873, which are all hereby incorporated herein by reference in their entireties. The camera or cameras may comprise any suitable cameras or imaging sensors or camera modules, and may utilize aspects of the cameras or sensors described in U.S. Publication Nos. US-2009-0244361 and/or US-2012-0019940, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication Nos. US-2006-0061008 and/or US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for displaying information to a driver of a vehicle, said method comprising:

disposing a camera at a vehicle so as to have a field of view exterior of the equipped vehicle, wherein the camera is operable to capture image data;

disposing a bimodal display at a display region at a windshield of the vehicle that is viewable by a driver of the vehicle when the driver is normally operating the vehicle, wherein the bimodal display is operable in a first mode and a second mode, and wherein, when the bimodal display operates in the first mode, the bimodal display at the display region is transmissive of visible light therethrough, and wherein, when the bimodal display operates in the second mode, images derived from image data captured by the camera are displayed at the display region;

providing a driver monitor operable to determine a gaze of the driver of the equipped vehicle;

providing a controller that controls the bimodal display responsive at least in part to the driver monitor;

determining, via the driver monitor, when the gaze of the driver is at the display region and when the driver is focusing at the display region for a threshold period of time;

with the equipped vehicle being driven by the driver, and responsive at least in part to determination by the driver monitor that (i) gaze of the driver is not at the display region or (ii) gaze of the driver is at the display region and the driver is not focusing at the display region for the threshold period of time, the bimodal display operates in the first mode;

with the equipped vehicle being driven, and responsive at least in part to determination by the driver monitor that (i) gaze of the driver of the vehicle is at the display region and (ii) the driver is focusing at the display region for the threshold period of time, changing operation of the bimodal display, via the controller, from the first mode to the second mode; and with the bimodal display operating in the second mode, displaying images at the display region that are derived from image data captured by the camera.

2. The method of claim 1, wherein, responsive at least in part to determination by the driver monitor that the gaze of the driver is not at the display region, the bimodal display operates in the first mode.

3. The method of claim 1, wherein, responsive at least in part to determination by the driver monitor that the gaze of the driver is at the display region and the driver is not focusing at the display region for the threshold period of time, the bimodal display operates in the first mode.

4. The method of claim 1, wherein the camera comprises a rearward viewing camera having a rearward field of view, and wherein the controller automatically changes operation of the bimodal display to the second mode when the equipped vehicle is executing a reversing maneuver.

5. The method of claim 1, wherein the bimodal display is disposed at a central region of the windshield of the equipped vehicle.

6. The method of claim 1, wherein the bimodal display comprises a projector in the vehicle and remote from the display region, and wherein the projector, when the bimodal display is operating in the second mode, projects images onto the windshield at the display region, and wherein the bimodal display comprises an element at the windshield that changes from a transparent state to a non-transparent state when the bimodal display changes operation from the first mode to the second mode.

7. The method of claim 6, comprising darkening, via the bimodal display, of a background of the display region when the bimodal display is operating in the second mode.

8. The method of claim 7, comprising changing, via the controller, and responsive at least in part to determination that the gaze of the driver is not at the display region, operation of the bimodal display to the first mode, wherein the projector is deactivated and the display region is changed to the transparent state when operation of the bimodal display changes to the first mode.

9. The method of claim 1, wherein the camera comprises a rearward viewing camera having a field of view rearward of the vehicle, and wherein the controller is operable to change operation of the bimodal display from the first mode to the second mode when the vehicle is driven forwardly.

10. The method of claim 1, wherein the bimodal display comprises a display screen disposed at the display region at an interior surface of the windshield.

11. The method of claim 10, wherein the display screen comprises (i) a first display portion that, when the bimodal display is operating in the second mode, displays images derived from captured image data and (ii) a second display portion that, when the bimodal display is operating in the second mode, displays navigation information.

12. The method of claim 11, comprising controlling, via the controller, and with the vehicle being driven forwardly, and responsive at least in part to determination that the gaze of the driver of the vehicle is at a second display region corresponding to the second display portion for a threshold period of time, the second display portion of the display screen to display navigation information.

13. The method of claim 12, comprising automatically controlling, via the controller, the second display portion to display navigation information when the vehicle is approaching a waypoint of a programmed route of the equipped vehicle.

14. The method of claim 1, wherein the driver monitor comprises an in-cabin camera having a field of view that encompasses the head of the driver of the equipped vehicle.

15. A method for displaying information to a driver of a vehicle, said method comprising:

disposing a camera at a rear portion of a vehicle so as to have a field of view exterior and rearward of the equipped vehicle, wherein the camera is operable to capture image data;

disposing a bimodal display at a display region at a windshield of the vehicle that is viewable by a driver of the vehicle when the driver is normally operating the vehicle, wherein the bimodal display is operable in a first mode and a second mode, and wherein, when the bimodal display operates in the first mode, the bimodal display at the display region is transmissive of visible light therethrough, and wherein, when the bimodal display operates in the second mode, images derived from image data captured by the camera are displayed at the display region;

providing a driver monitor operable to determine a gaze of the driver of the equipped vehicle;

providing a controller that controls the bimodal display responsive at least in part to the driver monitor;

determining, via the driver monitor, when the gaze of the driver is at the display region and when the driver is focusing at the display region for a threshold period of time;

with the equipped vehicle being driven by the driver, and responsive at least in part to determination by the driver monitor that (i) gaze of the driver is not at the display region or (ii) gaze of the driver is at the display region and the driver is not focusing at the display region for the threshold period of time, the bimodal display operates in the first mode;

with the equipped vehicle being driven, and responsive at least in part to determination by the driver monitor that (i) gaze of the driver of the vehicle is at the display region and (ii) the driver is focusing at the display region for the threshold period of time, changing operation of the bimodal display, via the controller, from the first mode to the second mode;

with the bimodal display operating in the second mode, displaying images at the display region that are derived from image data captured by the camera;

wherein the controller is operable to change operation of the bimodal display from the first mode to the second mode when the vehicle is driven forwardly; and wherein the controller automatically changes operation of the bimodal display to the second mode when the equipped vehicle is executing a reversing maneuver.

16. The method of claim 15, wherein the bimodal display comprises a display screen disposed at the display region at an interior surface of the windshield.

17. The method of claim 16, comprising darkening, via the bimodal display, of a background of the display region when the bimodal display is operating in the second mode.

18. A method for displaying information to a driver of a vehicle, said method comprising:

disposing a camera at a vehicle so as to have a field of view exterior of the equipped vehicle, wherein the camera is operable to capture image data;

disposing a bimodal display at a display region at a windshield of the vehicle that is viewable by a driver of the vehicle when the driver is normally operating the vehicle, wherein the bimodal display is operable in a first mode and a second mode, and wherein, when the bimodal display operates in the first mode, the bimodal display at the display region is transmissive of visible light therethrough, and wherein, when the bimodal display operates in the second mode, images derived from image data captured by the camera are displayed at the display region;

providing a driver monitor operable to determine a gaze of the driver of the equipped vehicle;

providing a controller that controls the bimodal display responsive at least in part to the driver monitor;

determining, via the driver monitor, when the gaze of the driver is at the display region and when the driver is focusing at the display region for a threshold period of time;

with the equipped vehicle being driven by the driver, and responsive at least in part to determination by the driver monitor that (i) gaze of the driver is not at the display region or (ii) gaze of the driver is at the display region and the driver is not focusing at the display region for the threshold period of time, the bimodal display operates in the first mode;

with the equipped vehicle being driven, and responsive at least in part to determination by the driver monitor that (i) gaze of the driver of the vehicle is at the display region and (ii) the driver is focusing at the display region for the threshold period of time, changing operation of the bimodal display, via the controller, from the first mode to the second mode;

with the bimodal display operating in the second mode, displaying images at the display region that are derived from image data captured by the camera;

wherein the bimodal display comprises (i) a first display portion that, when the bimodal display is operating in the second mode, displays images derived from captured image data, and (ii) a second display portion that, when the bimodal display is operating in the second mode, displays navigation information; and darkening, via the bimodal display, a background of the display region when the bimodal display is operating in the second mode.

19. The method of claim 18, comprising controlling, via the controller, and with the vehicle being driven forwardly, and responsive at least in part to determination that the gaze of the driver of the vehicle is at a second display region corresponding to the second display portion for a threshold period of time, the second display portion of the bimodal display to display navigation information.

20. The method of claim 19, comprising automatically controlling, via the controller, the second display portion to display navigation information when the vehicle is approaching a waypoint of a programmed route of the equipped vehicle.

* * * * *